3,374,218
PROTECTED DERIVATIVES OF PHYSALAEMIN
Luigi Bernardi, Germano Bosisio, Roberto de Castiglione, and Onofrio Goffredo, Milan, Italy, assignors to Società Farmaceutici Italia, Milan, Italy, a corporation of Italy
No Drawing. Filed Feb. 11, 1965, Ser. No. 432,008
Claims priority, application Italy, Feb. 12, 1964, 3,105/64
2 Claims. (Cl. 260—112.5)

The invention relates to a new undecapeptide which is therapeutically useful as a hypotensive, to protected derivatives and salts thereof and to a process for preparing them. The new undecapeptide of the invention is L-pyroglutamyl - L - alanyl - L - aspartyl-L-prolyl-L-asparaginyl-L - lysyl - L - phenylalanyl - L - tyrosyl-glycyl-L-leucyl-L-methioninamide, its protected derivatives which have the imino group of the pyroglutamyl radical, the amino group of the lysyl radical and the carboxyl group of the aspartyl radical not involved in the formation of the peptide linkage suitably blocked by a protective group capable of being removed by acidolysis or hydrogenolysis, and the non-toxic pharmaceutically acceptable acid addition salts thereof.

There are many possible syntheses of the undecapeptide of the invention, which consist of a series of condensations of amino acids with protected polypeptides so that the resulting undecapeptide has the desired sequence of eleven amino acids. The amino acids and the polypeptides, which are condensed, have their amino and carboxyl groups not involved in the formation of the peptide linkage blocked by a protective group capable of being removed by acidolysis or hydrogenolysis. The following protective groups may be employed for protecting amino groups: tosyl (p-toluenesulfonyl), carbobenzoxy (carbobenzyloxy), carbo-t-butoxy, trityl (triphenylmethyl), formyl, trifluoroacetyl and others usually employed in polypeptide chemistry. The following protective groups may be used for protecting carboxyl groups: methyl, ethyl, t-butyl, benzyl, p-nitrophenyl groups and others usually employed for this purpose. The condensation between the amino group of one molecule and the carboxyl group of another molecule to form the peptide linkage may be carried out according to the usual methods of polypeptide chemistry: for instance through a suitable activated acyl derivative, such as a mixed anhydride, azide and p-nitrophenyl ester, or by direct condensation between the free amino group and the free carboxyl group in the presence of a suitable condensing agent such as a carbodiimide selected from the group consisting of dicyclohexylcarbodiimide and 1 - cyclohexyl - 3 - morpholinylcarbodiimide. The condensation may be carried out in an N,N-dialkylformamide, lower aliphatic nitrile or pyridine solvent, for example dimethylformamide, acetonitrile or pyridine. The reaction starts between —10° C. and room temperature (20° C.) and is completed at room temperature in from 10 to 70 hours. From the protected undecapeptide, by elimination of the protective groups, one may obtain the undecapeptide either free or in the form of a salt with an organic or inorganic acid according to the splitting-off agent used for removing the protective groups. The choice of the splitting-off agent depends on the nature of the protective groups and may for example be metallic sodium in liquid ammonia, hydrogen in the presence of palladium catalyst, an anhydrous hydrogen halide in glacial acetic acid or trifluoroacetic acid.

The free undecapeptide may be obtained by displacement from its salts by means of a suitable base or by passing it through an ion exchange resin, for instance the new type of delayed ion exchange resin supplied by the Bio-Rad Laboratories, Richmond, Calif., under the code AG–11A8. The purification of the undecapeptide may be carried out by countercurrent distribution and chromatography over alumina, cellulose or an ion exchange resin, for example Amberlite IRC–50.

Typical acid addition salts are hydrochloride, sulfate, acetate, trifluoroacetate, gluconate, tartrate, maleate, maleinate, citrate, methanesulfonate, pamoate and other non-toxic pharmaceutically acceptable salts.

The preparation of the undecapeptide, which will be illustrated in greater detail, is based essentially on the condensation of the new pentapeptide L-phenylalanyl-L-tyrosyl - glycyl - L - leucyl - L - methioninamide (V) with the new acid hexapeptide carbo-t-butoxy - L - pyroglutamyl - L - alanyl - (β-t-butyl) - L - aspartyl-L-prolyl-L - asparaginyl - (N$^\epsilon$-carbo-t-butoxy) - L - lysine (X), wherein the carboxyl group of the aspartyl radical, the amine group of the lysyl radical and the pyroglutamyl radical are blocked by suitable protecting groups capable of being removed by acidolysis or hydrogenolysis.

An example of such a series of condensations for the preparation of the undecapeptide of the invention is as follows: L-tyrosine, whose phenol and amino groups are blocked by a protective carbobenzoxy group, is condensed with glycine-ethyl-ester hydrochloride in the presence of dicyclohexylcarbodiimide to yield the protected dipeptide dicarbobenzoxy - L - tyrosyl - glycine - ethyl ester (I) whose carbobenzoxy groups are then removed by treatment with anhydrous hydrogen bromide in glacial acetic acid. The dipeptide L - tyrosyl - glycine - ethyl ester thus obtained is condensed with carbo-t-butoxy - L - phenylalanine, to yield carbo - t - butoxy - L - phenylalanyl-L-tyrosyl-glycine-ethyl ester (II), whose ester group is then selectively hydrolyzed (saponified) to the free carboxyl group with dilute sodium or potassium hydroxide. The carbo - t - butoxy - L - phenylalanyl - L - tyrosyl-glycine (III), thus obtained is condensed with L - leucyl-L-methioninamide to yield carbo - t - butoxy - L - phenylalanyl-L-tyrosyl - glycyl - L - leucyl - L - methioninamide (IV), which on elimination of the protective group by an anhydrous hydrogen halide in glacial acetic acid, yields the pentapeptide L - phenylalanyl - L - tyrosyl - glycyl-L-leucyl-L-methioninamide (V), the first intermediate in the synthesis of the invention.

A protected derivative of aspartic acid, N-carbobenzoxy L-aspartic-α-p-nitrophenyl - β - t - butyl-eter (VI), is condensed with L-proline to obtain N-carbobenzoxy-(β-t-butyl)-L-aspartyl-L-proline (VII), which is condensed with the protected dipeptide L-asparaginyl-(N$^\epsilon$-carbo-t-butoxy)-L-lysine-methylester. Thus the protected tetrapeptide N-carbobenzoxy-(β-t-butyl)-L-aspartyl - L - prolyl - L-asparaginyl-(N$^\epsilon$-carbo-t-butoxy)-L - lysine - methylester (VIII) is obtained from which by removal of the protective group with hydrogen in the presence of palladium catalyst, (β-t-butyl)-L-aspartyl-L-prolyl - L - asparaginyl-(N$^\epsilon$-carbo-t-butoxy)-L - lysine - methylester is obtained. This is reacted with a protected derivative of alanine: carbobenzoxy-L-alanine-p-nitrophenylester, to yield carbobenzoxy-L-alanyl-(β-t-butyl)-L-aspartyl-L-prolyl - L - asparaginyl-(N$^\epsilon$-carbo-t-butoxy)-L-lysine-methylester (IX). The methyl-ester group of the pentapeptide IX is then selectively hydrolyzed to a free carboxyl group with dilute sodium or potassium hydroxide. The carbobenzoxy group of the pentapeptide is then split off by hydrogen in the presence of a palladium catalyst, to yield the pentapeptide L-alanyl-(β-t-butyl)-L-aspartyl-L-prolyl - L - asparaginyl-(N$^\epsilon$-carbo-t-butoxy)-L-lysine, which is reacted with carbo-t-butoxy-L-pyroglutamic acid p-nitrophenyl-ester to obtain the protected hexapeptide carbo-t-butoxy-L-pyroglutamyl-L-alanyl-(β-t-butyl)-L - aspartyl - L - prolyl - L-asparaginyl-(N$^\epsilon$-carbo-t-butoxy)-L-lysine (X).

A final condensation between the pentapeptide (V)

and the protected hexapeptide (X) gives the protected undecapeptide carbo-t-butoxy-L-pyroglutamyl-L-alanyl-(β-t-butyl)-L-aspartyl-L-prolyl - L - asparaginyl-(N$^\epsilon$-carbo-t-butoxy)-L-lysyl - L - phenylalanyl - L - tyrosyl-glycyl - L - leucyl-L-methioninamide (XI), from which on elimination of the protective groups the undecapeptide L-pyroglutamyl-L-alanyl-L-aspartyl-L - prolyl - L - asparaginyl-L-lysyl-L-phenylalanyl-L-tyrosyl - glycyl - L - leucyl - L-methioninamide (XII) is obtained in the form of a salt corresponding to the hydrogen halide used for the elimination of the protective groups.

The undecapeptide and its derivatives according to the invention display a high hypotensive and vasodilator activity and so may be usefully employed in the normal therapy of hypertension and in the emergency therapy of hypertensive attacks, in vascular spastic syndromes especially in muscle-cutaneous sections (Bürger's disease, Raynaud's disease, thromboangiitis obliterans, torpid ulcers) of the retinal vessels (amaurosis from spasm of the retina central action), of meningeal vessels (cephalea and hemicrania from vasospasm) and of the coronary vessels (angina attacks). They may be administered by the parenteral route: subcutaneously, intramuscularly, intravenously (a single injection or slow dripping) or intra-arterially. The most suitable solvents are water or physiological saline but not alkaline solutions. For use by the subcutaneous or intramuscular route, substances retarding absorption may be added. The percentage of active ingredient may vary according to the particular pharmaceutical form and according to the desired hypotensive effect, but generally it is very low. The polypeptides of the invention do not cause any symptoms of acute or chronic toxicity.

The following examples illustrate the invention. The chromatographic analysis data reported were carried out by the ascending technique on whatman paper No. 1 with the n-butanol/acetic acid/water (4:1:1) solvent system. The analytical data are expressed as R$f$. The electrophoretic migration coefficients are expressed in the symbolism in which $E_{1.9}$=0.905 Leu means that a pH 1.9 the polypeptide tested migrates with a velocity of 0.905 times that of leucine taken as unity.

EXAMPLE 1.—CARBO - t - BUTOXY - L - PYROGLUTAMYL-L - ALANYL - (β - t - BUTYL) - L-ASPARTYL-L-PROLYL - L - ASPARAGINYL-(N$^\epsilon$-CARBO-t-BUTOXY) - L - LYSYL - L - PHENYLALANYL-L-TYROSYL-GLYCYL - L - LEUCYL-L-METHIONINAMIDE (XI)

(a) *Preparation of the first intermediate: L-phenylalanyl-L-tyrosyl-glycyl-L-leucyl-L-methioninamide (V)*

To a solution of 9 g. of dicarbobenzoxy-L-tyrosine in 70 cc. of methylene dichloride, 2.8 g. of glycine-ethylester hydrochloride and 2.02 g. of triethylamine are added at 0° C. 4.12 g. of dicyclohexylcarbodiimide are added and the reaction mixture is kept overnight at room temperature, filtered, and the filtrate is washed in a separating funnel with a 5% aqueous citric acid solution and 5% aqueous sodium bicarbonate solution. The methylene dichloride layer is dried over anhydrous sodium sulfate and evaporated to dryness. On recrystallization of the residue from ethanol, 8.5 g. of dicarbobenzoxy-L-tyrosyl-glycine-ethylester (I) are obtained, melting at 165–166° C.; $[\alpha]_D^{20}$=—24.5° (c.=0.5 in DMF (dimethylformamide)).

8.7 g. of (I) are dissolved in 50 c. of a 32% solution of anhydrous hydrogen bromide in glacial acetic acid. The reaction mixture is allowed to stand for 2 hours at room temperature, evaporated in vacuo to dryness, and repeatedly taken up with anhydrous diethyl ether. The residue is dissolved in 70 cc. dimethylformamide (solution A). The following solution (solution B) is prepared separately. 4.3 g. of carbo-t-butoxy-L-phenylalanine are dissolved in 40 cc. of anhydrous tetrahydrofuran. 3.03 g. of tributylamine and 1.78 g. of ethylchloroformate at —10° C. are added and allowed to react for 30 minutes. The two solutions A and B are cooled to —10° C. and the solution A is added to solution B. 1.66 g. of triethylamine are added and the whole is allowed to stand for two hours at —10° C., then for two hours at 0° C., and afterwards overnight at room temperature. The product is evaporated to dryness, washed with water and recrystallized from methylene dichloride-petroleum ether. 7.8 g. of carbo-t-butoxy-L-phenylalanyl-L-tyrosyl-glycine-ethylester (II) are obtained, melting at 190–191° C.; $[\alpha]_D^{25}$=—16° (c.=0.7 in DMF).

A solution of 5 g. of the protected tripeptide (II) in 25 cc. of ethanol is treated at room temperature with 25 cc. of 1 N sodium hydroxide. After 20 minutes, the mixture is diluted with 50 cc. of water, slightly acidified to pH 6 with dilute hydrochloric acid and the non-reacted part of the tripeptide (II) is extracted with diethyl ether. The reaction mixture is acidified to pH 1 with dilute hydrochloric acid and extracted with ethyl acetate. The ethyl acetate extracts are evaporated in vacuo to dryness and the residue is recrystallized from acetone-petroleum ether. 3.9 g. of carbo-t-butoxy-L-phenylalanyl-L-tyrosyl-glycine (III) are obtained, melting at 144–146° C.; $[\alpha]_D^{20}$=—14.3° (c.=0.5 in DMF).

A solution of 3.4 g. of tripeptide (III) and of 2.07 g. of L-leucyl-L-methioninamide hydrochloride (described in U.S. patent application Ser. No. 367,875, now U.S. Patent 3,300,469, in 15 cc. of dimethylformamide is treated with 0.7 g. of triethylamine and 1.44 g. of dicyclohexylcarbodiimide at —10° C. The reaction mixture is allowed to stand for two hours at —10° C., overnight at 0° C., and for two days at room temperature. The mixture is filtered, the filtrate is concentrated to dryness, and the residue is taken up with 250 cc. of water, filtered, washed with water, dried, and the residue is suspended in 150 cc. of boiling acetone and is filtered while warm. 4.0 g. of carbo - t-butoxy-L-phenylalanyl-L-tyrosyl-glycyl-L-leucyl-L-methioninamide (IV) are obtained, melting at 229–230° C.; $[\alpha]_D^{20}$=—22.3° (c.=0.5 in DMF).

1 g. of this pentapeptide (IV) is dissolved in 20 cc. of a 4.4% solution of anhydrous hydrogen chloride in glacial acetic acid. The reaction mixture is allowed to stand for 1 hour at room temperature, is evaporated in vacuo to dryness, and the residue is then dissolved in a small amount of dimethylformamide and diluted with diethyl ether. 0.88 g. of L-phenylalanyl-L-tyrosyl-glycyl-L-leucyl-L-methioninamide hydrochloride (V) are obtained, melting at 120–122° C. (with decomposition);

$$[\alpha]_D^{20}=-11.2°$$

(c.=0.5 in acetic acid).

(b) *Preparation of the second intermediate: carbo-t-butoxy-L-pyroglutamyl - L - alanyl-(β-t-butyl)-L-aspartyl-L-prolyl-L-asparaginyl-(N$^\epsilon$-carbo-t-butoxy)-L-lysine (X)*

To a solution cooled to 0° C. of 18.2 g. of carbobenzoxy-L-aspartic acid β-t-butyl ester (described by Schwyzer, Helv. Chim. Acta, 1961, 44, page 2003) in 300 cc. of ethyl acetate, 9.26 g. of p-nitrophenol and 11.4 g. of dicyclohexylcarbodiimide are added. The solution is allowed to stand for one hour at 0° C. and overnight at room temperature, is filtered, and the filtrate is diluted with ethyl acetate and repeatedly washed with 5% aqueous sodium carbonate. The filtrate is evaporated in vacuo and the residue recrystallized from diethyl ether. 17 g. of carbobenzoxy-aspartic acid α-p-nitrophenyl-β-t-butyl ester (VI) are obtained, melting at 84–86° C;

$$[\alpha]_D^{20}=+3.5°$$

(c.=3 in chloroform).

2.19 g. of L-proline are suspended in 300 cc. of chloroform and 1.9 g. of triethylamine and 8.5 g. of the protected amino acid (VI) are added. The solution is stirred for 2 days at 35° C., dried in vacuo, and the residue is taken up with 200 cc. of water containing 6 g. of sodium bicarbonate and extracted twice with diethyl ether. The aqueous alkaline solution is cooled to −10° C., acidified to pH 1 with hydrochloric acid and extracted with methylene dichloride. The extracts are evaporated in vacuo to dryness, the residue consisting of crude carbobenzoxy-(β-t-butyl)-L-aspartyl-L-proline is dissolved in 30 cc. of diethyl ether, treated with 3.3 g. of dicyclohexylamine and allowed to stand overnight at room temperature. 9.6 g. of carbobenzoxy - (β - t-butyl)-L-aspartyl-L-proline-dicyclohexylammonium salt are obtained, melting at 132–133° C.; $[\alpha]_D^{20}=-30°$ (c.=0.5 in DMF).

This last product is suspended in 250 cc. of ice water, treated with 1.31 g. of phosphorous acid, and extracted with methylene dichloride, and the extract is evaporated in vacuo to dryness. 7.2 g. of carbobenzoxy-(β-t-butyl)-L-aspartyl-L-proline (VII) are obtained, as an oily substance.

2.54 g. of carbobenzoxy - L - asparaginyl-(N$^\epsilon$-carbo-t-butoxy) - L - lysine - methyl ester (described by Sandrin, Helv. Chim. Acta, 1963, 46, page 1637), are dissolved in 150 cc. of ethanol and 150 cc. of tetrahydrofuran and are hydrogenated in the presence of 1.5 g. of 10% palladium on charcoal. When the development of carbon dioxide is over, the reaction mixture is concentrated in vacuo at low temperature to dryness, and the residue is dissolved in 20 cc. of tetrahydrofuran. To this solution, cooled to −10° C., a solution is added of 2.1 g. of the protected dipeptide (VII) dissolved in 25 cc. of tetrahydrofuran and 0.7 cc. of triethylamine which has been cooled to −10° C., had 0.5 cc. of ethyl chloroformate added, and been allowed to stand at −10° C. for 30 minutes. After combining the two solutions, the temperature is kept at −10° C. for two hours, and the mixture is allowed to stand overnight at room temperature. The solution is dried in vacuo, the residue is taken up with ethyl acetate and washed in a separating funnel at −5° C. with a solution of sodium chloride and dilute hydrochloric acid. The mixture is again washed with a 5% aqueous sodium bicarbonate solution, and finally with water, and is dried in vacuo and the residue is recrystallized from ethyl acetate/petroleum ether. 2.5 g. of carbobenzoxy-(β-t-butyl)-L-aspartyl-L-prolyl - L - asparaginyl - (N$^\epsilon$-carbo-t-butoxy)-L-lysine-methyl ester (VIII) are obtained, melting at 105–107° C.; $[\alpha]_D^{20}=-40°$ C. (c.=0.3 in DMF).

1.42 g. of this protected tetrapeptide (VIII) are dissolved in 100 cc. of ethanol and hydrogenated in the presence of 2 g. of 10% palladium on charcoal. When the hydrogenation is over, the reaction mixture is filtered and dried in vacuo, the residue is taken up with 10 cc. of dimethylformamide and 0.46 g. of carbobenzoxy-L-alanine-p-nitrophenyl ester are added. The reaction mixture is allowed to stand for 2 days at room temperature, is evaporated in vacuo to dryness, and the residue is dissolved in ethyl acetate, and washed at −10° C. with dilute aqueous hydrochloric acid, sodium chloride and sodium bicarbonate. The solution is evaporated in vacuo to dryness and the residue is taken up three times with warm diethyl ether. The residue is dissolved in ethyl acetate. On adding diethyl ether, a gelatinous solid separates. 0.9 g. of carbobenzoxy-L-alanyl-(β-t-butyl)-L-aspartyl-L-prolyl-L-asparaginyl - (N$^\epsilon$-carbo-t-butoxy) - L - lysine-methyl ester (IX) are obtained, melting at 103–106° C.; $[\alpha]_D^{20}=-59°$ (c.=1 in ethanol).

2.12 g. of this protected pentapeptide (IX) dissolved in 50 cc. of ethanol are treated with 25 cc. of 1 N sodium hydroxide diluted with 10 cc. of water. The reaction mixture is allowed to stand for 1 hour at room temperature, 2 cc. of 5% sodium bicarbonate added thereto, diluted with 180 cc. of water and twice extracted with ethyl acetate. The solution is cooled to −10° C., acidified to Congo red with 1 N hydrochloric acid and extracted with ethyl acetate. On evaporation of the ethyl acetate, 1.6 g. of amorphous product are obtained consisting of carbobenzoxy-L-alanyl-(β-t-butyl) - L - aspartyl-L-prolyl-L-asparaginyl-(N$^\epsilon$-carbo-t-butoxy) - L-lysine as an amorphous foam: $E_{5.8}=0.27$ Glu.

This foam is taken up with 120 cc. of ethanol and 120 cc. of tetrahydrofuran and hydrogenated in the presence of 1 g. of 10% palladium on charcoal. When the development of carbon dioxide is over, the mixture is filtered and concentrated in vacuo to dryness. The residue is dissolved in 12 cc. of dimethylformamide and treated with 0.7 g. of carbo-t-butoxy-L-pyroglutamate of p-nitrophenol (prepared as described below) and 0.25 g. of triethylamine. The reaction mixture is kept at 35° C. and evaporated to dryness in vacuo; the residue is taken up with 50 cc. of water containing 0.7 g. of sodium bicarbonate and extracted twice with ethyl acetate. The alkaline solution cooled to −10° C. is acidified to pH 5.5 with 1 N hydrochloric acid, extracted with diethyl ether, acidified to pH 1, and extracted with ethyl acetate.

Thus carbo-t-butoxy-L-pyroglutamyl - L - alanyl-(β-t-butyl)-L-aspartyl - L - prolyl-L-asparaginyl-(N$^\epsilon$-carbo-t-butoxy)-L-lysine (X) is obtained, melting at 143–148° C. (with decomposition); $[\alpha]_D^{20}=-67°$ (c.=0.5 in ethanol); $E_{5.8}=0.20$ Glu.

Carbo-t-butoxy-pyroglutamic acid p-nitrophenyl ester mentioned above is prepared as follows: To a suspension of 14 g. of glutamic acid in 200 cc. of dimethylformamide, 23.9 g. of t-butyl-carbonate and p-nitrophenol and 40 cc. of triethylamine are added. The suspension is stirred for three days at 37° C., dried in vacuo, and the residue is taken up with 5% aqueous sodium bicarbonate. The solution is acidified to pH 5.3, twice extracted with diethyl ether, acidified to pH 1 with concentrated hydrochloric acid at −10° C., and extracted with diethyl ether. The extract is evaporated in vacuo to dryness and the residue dissolved in 170 cc. of tetrahydrofuran. The resulting solution is treated at 0° C. with 15.1 g. of dicyclohexylcarbodiimide. The reaction mixture is allowed to stand overnight at room temperature, is filtered, and evaporated in vacuo to dryness. The residue is dissolved in 130 cc. of diethyl ether and the resulting solution is treated with 13.6 g. of dicyclohexylamine. An abundant precipitate of dicyclohexylammonium salt of carbo-t-butoxy - L - pyroglutamic acid is obtained: 21.3 g. of product, melting at 180–181° C.; $[\alpha]_D^{20}=-7°$ (c.=0.5 in chloroform).

To a suspension of 5.3 g. of this dicyclohexylammonium carbo-t-butoxy-L-pyroglutamate in 150 cc. of ice-water is added 1.4 g. of phosphorus acid and the mixture is thoroughly shaken with 250 cc. of diethyl ether. The ether extract is evaporated in vacuo to dryness and the residue is dissolved in 50 cc. of ethyl acetate. The resulting solution is treated at 0° C. with 2.1 g. of p-nitrophenol and 2.55 g. of dicyclohexylcarbodiimide. The mixture is allowed to stand overnight at room temperature, is filtered, and the filtrate is evaporated in vacuo to dryness. The residue is recrystallized from diethyl ether. 2.5 g. of carbo-t-butoxy-L-pyroglutamic acid p-nitrophenyl ester are obtained, melting at 143–145° C.; $[\alpha]_D^{20}=-26°$ (c.=0.5 in ethanol).

(c) *Final condensation: Carbo-t-butoxy-L-pyroglutamyl-L - alanyl-(β-t-butyl)-L-aspartyl-L-prolyl-L-asparaginyl - (N$^\epsilon$-carbo-t-butoxy)-L-lysyl-L-phenylalanyl-L-tyrosyl-glycyl-L-leucyl-L-methioninamide (XI)*

0.7 g. of the protected hexapeptide (X) prepared as under (b) above are dissolved in 10 cc. of anhydrous pyridine together with 0.83 g. of L-phenylalanyl-L-tyrosyl-glycyl-L-leucyl-L-methioninamide hydrochloride (V) prepared as under (a) above and 0.21 g. of dicyclohexylcarbodiimide. The mixture is allowed to stand for 2 days at room temperature, is evaporated in vacuo to dryness and the residue is dissolved in 150 cc. of the lower layer of the methanol/water/carbon tetrachloride/chloroform (8:3:3:7) mixture separately prepared, and is diluted with 300 cc. of water. A gelatinous precipitate separates, which is collected, dissolved in a further amount of the lower layer of the same mixture, and shaken at −10° C. with the same amount of the upper layer to which 1 cc. of concentrated hydrogen chloride was added, and then with the same amount of the upper layer saturated with sodium bicarbonate. The solution is evaporated in vacuo to dryness and purified by recrystallization from methanol/carbon tetrachloride/diethyl ether. After two recrystallizations, 0.4 g. of carbo-t-butoxy-L-pyroglutamyl-L-alanyl-($\beta$ - t-butyl)-L-aspartyl-L-prolyl-L-asparaginyl-(N$^\epsilon$-carbo-t - butoxy) - L-lysyl-L-phenylalanyl-L-tyrosyl-glycyl-L-leucyl-L-methioninamide are obtained, melting at 155–158° C. (with decomposition); $[\alpha]_D^{20} = -59°$ (c.=0.3 in ethanol).

By employing an hexapeptide protected by protective groups other than carbo-t-butoxy- and t-butyl-groups and by operating under analogous experimental conditions, the corresponding protected derivatives of the undecapeptide L - pyroglutamyl - L-alanyl-L-aspartyl-L-prolyl-L-asparaginyl - L-lysyl-L-phenylalanyl-L-tryrosyl-glycyl-L-leucyl-L-methioninamide may be obtained.

EXAMPLE 2.—L - PYROGLUTAMYL-L-ALANYL-L-ASPARTYL - L-PROLYL-L-ASPARAGINYL-L-LYSYL - L-PHENYLALANYL-L-TYROSYL-GLYCYL-L - LEUCYL-L-METHIONINAMIDE (XII)

0.1 g. of the undecapeptide (XI) prepared as in Example 1 are dissolved in 40 cc. of trifluoroacetic acid containing 4% anhydrous hydrogen chloride. The reaction mixture is allowed to stand for 3 hours at room temperature, is filtered, the filtrate is evaporated in vacuo to dryness, and the residue is pulped with diethyl ether three times and once with 15 cc. of acetone. The mixture is filtered and dissolved in 5 cc. of absolute ethanol. The solution is filtered from the small amount of insoluble pitchy residue and dried in vacuo. The residue is pulped in a small amount of diethyl ether and filtered. 0.065 g. of L-pyroglutamyl-L-alanyl-L-aspartyl-L-prolyl-L-asparaginyl - L-lysyl-L-phenylalanyl-L-tyrosyl-glycyl-L-leucyl-L-methioninamide trifluoroacetate (XII) are obtained, melting at 180° C. (with decomposition); $[\alpha]_D^{25} = -57°$ (c.=0.3 in ethanol); $E_{1.9}=0.43$ Leu.

By treating said product with a suitable basic agent, the free undecapeptide can be obtained and may be converted into other non-toxic pharmaceutically acceptable organic and inorganic acid addition salts.

We claim:

1. The protected undecapeptide of the structure L-pyroglutamyl - L-alanyl-L-aspartyl-L-prolyl-L-asparaginyl-L - lysyl-L-phenylalanyl-L-tyrosyl-glycyl-L-leucyl-L-methioninamide having the imino group of the pyroglutamyl radical and the $\epsilon$-amino group of the lysyl radical blocked by a protecting group selected from the group consisting of trityl, tosyl, phthalyl, carbobenzoxy, carbo-t-butoxy, trifluoroacetyl, formyl and the $\beta$-carboxyl group of the aspartyl radical blocked by a protecting group selected from the group consisting of methyl, ethyl, t-butyl, benzyl, and p-nitrophenyl.

2. Carbo - t - butoxy-L-pyroglutamyl-L-alanyl-($\beta$-t-butyl) - L - aspartyl-L-prolyl-L-asparaginyl-(N$^\epsilon$-carbo-t-butoxy)-L-lysyl-L-phenylalanyl-L-tyrosyl-glycyl-L-leucyl-L-methioninamide.

References Cited

UNITED STATES PATENTS

| 3,309,353 | 3/1967 | Boissonnas et al. | 260—112.5 |
| 3,190,869 | 6/1955 | Weygand et al. | 260—112 |
| 3,228,926 | 1/1966 | Kappeler et al. | 260—112.5 |
| 3,247,178 | 4/1966 | Schwyzer et al. | 260—112.5 |
| 3,264,280 | 8/1966 | Hofmann et al. | 260—112.5 |

OTHER REFERENCES

Erspramer et al.: Experimentia 18 (1952), 562–563.
Schroder et al.: Experimentia 20, 19–21 (1964).
Erspamer et al.: Experimentia 20, 489–490 (1964).
Bernardi et al.: Experimentia 20, 490–492 (1964).

LEWIS GOTTS, *Primary Examiner.*

ELBERT L. ROBERTS, *Examiner.*

M. M. KASSENOFF, *Assistant Examiner.*